United States Patent [19]

Noyes et al.

[11] 4,167,443
[45] Sep. 11, 1979

[54] SELF-ACTUATED RATE OF CHANGE OF PRESSURE SCRAM DEVICE FOR NUCLEAR REACTORS

[75] Inventors: Richard C. Noyes, New Britain; Shakir U. Zaman, Windsor; Douglas W. Stuteville, Granby, all of Conn.

[73] Assignee: Combustion Engineering, Inc., Windsor, Conn.

[21] Appl. No.: 829,163

[22] Filed: Aug. 30, 1977

[51] Int. Cl.$^2$ ............................................. G21C 7/08
[52] U.S. Cl. ............................ 176/36 R; 176/DIG. 5
[58] Field of Search ................ 176/36, 86 R, DIG. 3, 176/DIG. 5

[56] References Cited

U.S. PATENT DOCUMENTS

| | | | |
|---|---|---|---|
| 3,008,889 | 10/1961 | Junkins | 176/DIG. 3 |
| 3,088,902 | 5/1963 | Kumpf | 176/36 R |
| 3,212,976 | 10/1965 | White | 176/86 R |
| 3,733,251 | 5/1973 | Gilbertson et al. | 176/36 R |

FOREIGN PATENT DOCUMENTS

| | | | |
|---|---|---|---|
| 872092 | 7/1961 | United Kingdom | 176/DIG. 5 |
| 908059 | 10/1962 | United Kingdom | 176/36 C |

OTHER PUBLICATIONS

ANLCT-74-10-Proposal for the Development of Self-Actuated Shutdown Systems for LMFBR Plants, AEC, (4/74), pp. 2, 3, 34, 35, 44, 48, 49.

*Primary Examiner*—Samuel W. Engle
*Assistant Examiner*—S. A. Cangialosi
*Attorney, Agent, or Firm*—Lombro J. Ristas

[57] ABSTRACT

A sensor chamber having one cavity containing coolant separated by a diaphragm from another cavity containing a fixed mass of inert gas is located within a safety assembly of a liquid metal-cooled nuclear reactor. The liquid cavity is in fluid communication with the coolant outside the chamber through a flow limiting orifice. An actuating bellows in fluid communication with the gas cavity is in contact with coolant outside the chamber and is connected to a push rod, which serves as a trigger for a poison bundle release mechanism. During slow changes in reactor coolant pressure experienced under normal operation, the diaphragm moves to equalize the gas cavity and liquid cavity pressures with the coolant pressure outside the chamber. The actuating bellows does not move because it is biased so that a threshold pressure difference is required before it will expand. Under a more rapid drop in coolant pressure, such as is associated with a loss of forced flow, the threshold is overcome and the actuating bellows will also move, thereby triggering the release mechanism to shut down the reactor. In an alternate embodiment, the actuating bellows is connected to the liquid cavity rather than to the gas cavity.

11 Claims, 2 Drawing Figures

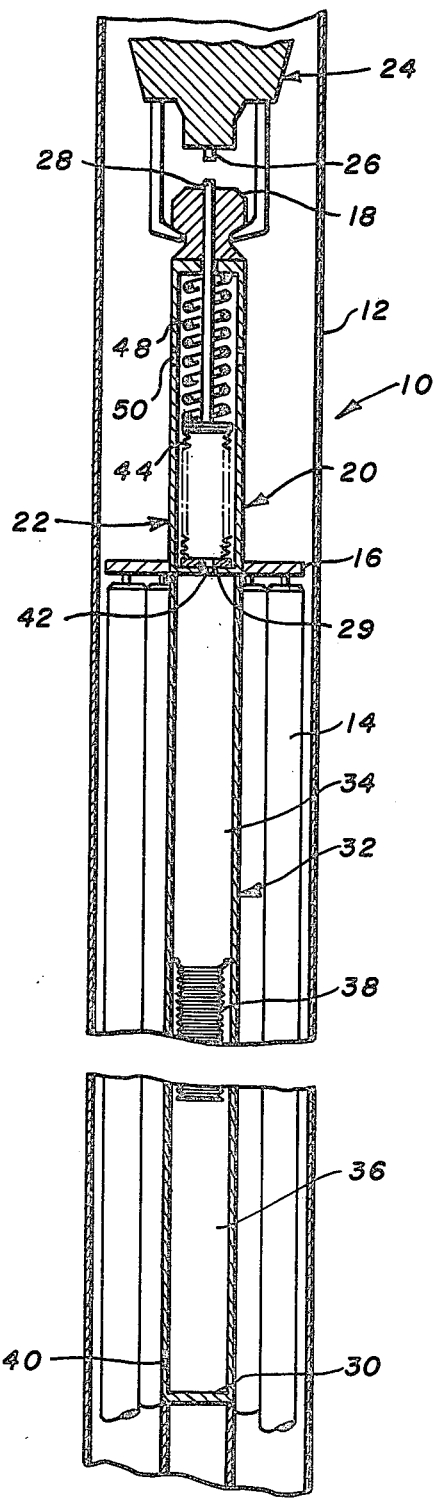
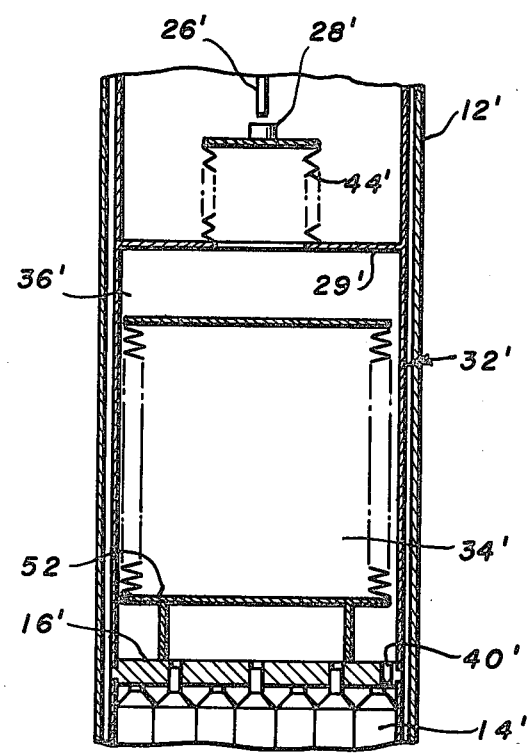
FIG. 1
FIG. 2

SELF-ACTUATED RATE OF CHANGE OF PRESSURE SCRAM DEVICE FOR NUCLEAR REACTORS

BACKGROUND OF THE INVENTION

The present invention relates to self-actuated scram systems for dropping neutron absorbing poisons into the core of a nuclear reactor, and in particular to systems responsive to the rate of pressure drop associated with a loss of forced liquid coolant flow.

In all kinds of nuclear power reactors, a reactor coolant flows through the power producing core of the reactor in order to remove the heat generated therein. If the coolant flow rate becomes too low in proportion to the power level of the core, a dangerous condition occurs wherein the core will become so hot that damage to the fuel is likely.

The plant protective system has instrumentation designed to sense a flow rate that is too low, and to drop (scram) safety poison rods into the reactor core, thereby terminating the power produced therein. Particularly in reactors designed to operate with a fast neutron energy spectrum (fast reactors) and with a high power density, it is essential that the safety poison be inserted very quickly upon a rapid drop in the coolant flow rate. It is desirable in this kind of reactor to have a backup method of dropping poison into the reactor core that does not rely on instrumentation, but rather is self-actuated by a rapid drop in the coolant flow rate. It is important, however, that the backup system not initiate a scram in response to the normal power-dependent changes in coolant flow.

The normal flow rate through a liquid-metal cooled reactor is approximately proportional to the power level, and the normal coolant pressure at any location in the reactor is allowed to vary with the flow. A rapid loss of forced flow will produce an immediate drop in the coolant pressure throughout the reactor. The rate of pressure change associated with loss of flow incidents is typically known from calculation or measurements, but this knowledge has not previously been used to achieve self-actuated scram on loss of liquid coolant flow.

The prior art contains self-actuated scram systems for responding to rapid changes in the pressure of a gaseous reactor coolant, where the coolant pressure itself rather than the flow rate is the most important safety parameter. One prior art device responsive to the rate of change of pressure in a gas-cooled reactor is described in British Pat. No. 872,092 issued to S. Baldwin et al, on July 5, 1961. This device has a combined sensor chamber and actuating bellows filled with gas that is in fluid communication, through a small orifice in the chamber, with the gas coolant flowing outside the chamber. A large rate of change of pressure drop causes the actuating bellows to expand due to the inability of the pressure within the chamber to rapidly equilibrate through the orifice. The bellows expansion actuates a release mechanism to drop poison material into the core. If a Baldwin-type device were placed in a liquid coolant environment, the presence of liquid both inside and outside the chamber would produce at best only a very small actuating bellows motion, even for a large rate of pressure drop. In a liquid environment the lack of fluid compressability would preclude operability of the device. This is particularly true in a liquid metal-cooled reactor where the maximum rate of change in pressure during the most severe loss of flow accident is only about 20 psi per second.

The prior art known to the Applicants is unsatisfactory for use with a liquid coolant, and does not suggest modifications for improving the performance of the prior art in a liquid-cooled reactor.

SUMMARY OF THE INVENTION

It is a general object of the present invention to effectuate a rapid, self-actuated scram in response to the rate of change in reactor coolant pressure associated with loss of forced coolant flow incidents in liquid cooled nuclear reactors.

The inventive device comprises an actuating bellows in fluid communication with a sensor chamber, both of which are disposed in a coolant flow path within the reactor. The sensor chamber is in fluid communication with coolant in the flow path through a flow limiting orifice. The present invention provides a novel source of potential energy within the sensor chamber for use against the inside of the actuating bellows on the occurrence of an excessive rate of pressure change outside the chamber. This is accomplished by an expandable cavity within the chamber, having a fixed mass of gas acting an a diaphragm. The pressure of the confined gas tends to keep the inside of the actuating bellows at a higher pressure for a longer time following a rapid pressure drop outside the chamber than would occur in the prior art devices. The gas cavity prevents the chamber pressure from quickly reaching equilibrium after only a small amount of liquid leaves the chamber through the flow limiting orifice, as would occur with the prior art devices.

The potential energy stored in the gas cavity can be exerted directly on the actuating bellows by connecting the actuating bellows to the gas cavity, or in an alternate embodiment, the actuating bellows is connected to the liquid cavity within the chamber and the gas cavity pressure is indirectly exerted on the actuating bellows. In both embodiments, the maintenance of a higher pressure within the actuating bellows relative to a rapidly decreasing pressure outside the actuating bellows causes the actuating bellows to expand and to move the push rod enough to actuate the poison release mechanism. Expansion of the actuating bellows under normal operating conditions is prevented by providing the actuating bellows with a spring constant, relative to that of the diaphragm, that will achieve a desired rate of pressure change actuation threshold.

BRIEF DESCRIPTION OF THE DRAWINGS

FIG. 1 shows an elevation view of a portion of a safety assembly and one embodiment of the invention.

FIG. 2 shows an enlarged view of an alternate embodiment of the invention.

DESCRIPTION OF THE PREFERRED EMBODIMENTS

The benefits of the present invention are most pronounced when the invention is used in a liquid metal-cooled nuclear reactor. Accordingly, two embodiments suitable for use in such an environment will be described.

There is shown in FIG. 1 a typical safety assembly 10 for a liquid metal nuclear reactor (not shown) consisting of a duct tube 12 wherein are located a multiplicity of poison rods 14 containing neutron absorbing poison material such as $B_4C$. The poison rods 14 are rigidly spaced and secured at their tops by connector plate 16 to which is attached central column 20. The poison rods 14, connector plate 16 and central column 20 collectively form the poison bundle 22, which is slidably disposed within duct tube 12 and is located in the upper part of the reactor so that the poison rods 14 are normally withdrawn from the power producing region, or core, of the reactor. The poison bundle 22 is held above the core by a poison bundle release mechanism 24 that selectively grips or releases the knob 18 formed at the top of the central column 20.

The purpose of this embodiment of the invention is to quickly actuate the release mechanism 24 upon the occurrence of an excessive drop in the rate of reactor coolant flowing through the core. In the illustrated embodiment, the release mechanism 24 is actuated upon an upward displacement of the stem 26 by the actuating push rod 28. The present invention is contained within the central column 20, and as will be described below, produces the required upward displacement of the actuating push rod 28 in response to the rate of change in pressure that accompanies an excessive drop in the coolant flow. Although a mechanical gripper release mechanism 24 is illustrated in FIG. 1, the invention may be used with any kind of release mechanism actuated by a linear displacement of a member.

The central column 20 has partitions 29, 30 which form a sensor chamber 32 separated into a gas cavity 34 and a coolant cavity 36 by an expandable, impermeable diaphragm such as the compensating bellows 38. The gas cavity 34 contains a fixed mass of gas, preferably an inert gas such as argon. The chamber wall along the coolant cavity 36 has a flow limiting orifice 40 leading outside the central column 20. The partition 29 that forms one of the chamber walls of the gas cavity 34 has an opening 42 leading into an actuating bellows 44 to which is attached the push rod 28.

During normal operation of the reactor, liquid metal coolant such as sodium flows upward through the duct tube 12 at a flow rate proportional to the flow rate through the core of the reactor. The coolant flow rate is normally varied with power level, and thus the pressure of the coolant at any point in the reactor also varies during normal operation. As the coolant flows through the duct tube 12 outside central column 20, the pressure within the coolant cavity 36 remains in equilibrium with the coolant pressure outside the chamber 32 feed and bleed through orifice 40. The gas pressure in gas cavity 34 is also maintained in equilibrium with the coolant cavity pressure by action of the compensating bellows 38. Although the gas cavity 34 is in fluid communication with the actuating bellows 44, the spring 48 biases the actuating bellows so that the movement of the compensating bellows 38 rather than of the actuating bellows 44 maintains the pressure equilibrium between the chamber 32 and the coolant outside the chamber. This bias may also be achieved by suitable stiffness in the actuating bellows itself.

In the event of an inadvertant loss of coolant pumping capability, the pressure outside the chamber 32 will drop at a much faster rate than occurs during normal power level changes. Some coolant in the coolant cavity 36 flows through orifice 40, but not at a rate fast enough to commensurately decrease pressure within the gas cavity 34. The compensating bellows 38 will expand as the pressure in the collant cavity 36 decreases, but the actuating belows 44 will also expand, displacing the push rod 28 enough to actuate the release mechanism 24.

The expansion of the actuating bellows 44 is primarily due to the potential energy stored in the gas cavity 34 exerted directly on the inside of the actuating bellows 44, thereby providing a pneumatic damper-type action. Because of the pressure communication provided by holes 50, the pressure on the outside of actuating bellows 44 is that of the reactor coolant outside central column 20. As a result of the greatly reduced flow rate in the duct tube 12, there is a larger pressure difference between the gas cavity 34 and the combined pressure of the reactor coolant and spring 48, than between the gas cavity 34 and the liquid cavity 36. Thus, at a predetermined rate of pressure drop the activating pressure threshold between the actuating bellows 44 and the coolant outside the chamber will be overcome.

In FIG. 2, where primed numerals designate corresponding structure having like numerals in FIG. 1, there is shown an alternate embodiment of the invention wherein the potential energy in the gas cavity 34' is exerted indirectly on the actuating bellows 44'. In this embodiment, the sensor chamber 32' is located above the poison rods 14' and is bounded by partition 29' and the connector plate 16'. The flow limiting orifice 40' in the connector plate 16 permits coolant to fill the coolant cavity 36', the boundary of which is coterminous with the inner boundary of the chamber 32'. A pedestal 52 attached to the connector plate 16' supports the gas cavity 34', which is in the form of a large bellows. The actuating bellows 44' is connected to and is in fluid communication with the upper portion of the coolant cavity 36'. The outside of the actuating bellows 44' is in contact with the reactor coolant flowing through the duct tube 12'.

The normal variations in reactor coolant pressure are accommodated by feed and bleed through orifice 40 and the compensating expansion and contraction of the volume of the gas cavity 34'. The actuating bellows 44' will not move unless the differential pressure between the inside and outside of the actuating 44' overcomes a threshold determined by the spring constant of the actuating bellows 44' relative to that of the compensating bellows 34'. During a severe rate of pressure change, the coolant can not exit through the orifice 40' quickly enough to equilibrate the pressure in the coolant cavity 36'. Although the pressure in the coolant cavity 36' is tending to drop with the reactor coolant pressure outside the chamber 32', the potential energy in the gas cavity 34' exerts enough pressure on the coolant in the coolant cavity 36' in the vicinity of the actuating bellows 44' to sustain sufficient pressure difference between the inside and the outside of the actuating bellows 44' to cause the displacement of the push rod 28'. This action displaces the stem 26 enough to actuate a release mechanism (not shown).

The illustrated embodiments are primarily intended to protect the reactor from the consequence of a loss of forced liquid flow. The invention will, however, respond to a predetermined rate of pressure drop regardless of the initiating event.

The relationship of size and shape of the cavities, the size and stiffness of the bellows, the size of the orifice, and the mass of gas are all design variables to be chosen according to the size of the duct tube, the operating and transient pressure characteristics of the reactor system, and the kind of scram release mechanism to be actuated. It is believed that the foregoing description will enable one ordinarily skilled in this field to accomplish the particular results desired for a particular reactor system. Accordingly, various modifications can be made to the illustrated embodiments without departing from the scope of the invention.

What is claimed is:

1. In a nuclear reactor having liquid coolant passing therethrough, an apparatus for actuating a poison bundle release mechanism in response to a predetermined rate of decrease in the pressure of the coolant, comprising:

a rigid chamber located within the reactor and in restricted fluid communication with the coolant pressure near said chamber;

moveable actuating means externally attached to said chamber having a movement responsive to a difference in pressure between the coolant passing near said chamber and the contents of said chamber where said actuating means is attached;

pneumatic damping means located within said chamber and associated with the coolant within said chamber and with said actuating means such that for normal rates of pressure change there is substantially no motion of said actuating means, but for an excessive rate of pressure decrease said actuating means moves sufficiently to actuate the mechanism.

2. In a nuclear reactor having liquid coolant passing therethrough, an apparatus for actuating a poison bundle release mechanism in response to a predetermined rate of decrease in the pressure of the coolant, comprising:

a rigid chamber located within the reactor comprising a first cavity containing coolant in restricted fluid communication with coolant passing near said chamber and a second, gas-filled sealed cavity, at least a portion of which is expandable inside said first cavity;

expandable actuating means externally attached to said chamber and to one of said cavities having a movement responsive to a difference in pressure between the coolant passing through the reactor near said chamber and the contents of said one of said cavities, for releasing the mechanism.

3. The apparatus of claim 2 wherein said actuating means is in fluid communication with said first cavity of said chamber.

4. The apparatus of claim 2 wherein said actuating means is in fluid communication with said second cavity of said chamber.

5. The apparatus of claim 3 wherein said expandable portion of said second cavity comprises a compensating bellows.

6. The apparatus of claim 4 whrein said expandable portion of said second cavity comprises a compensating bellows.

7. The apparatus of claim 5 wherein said actuating means comprises a bellows.

8. The apparatus of claim 6 wherein said actuating means comprises a bellows.

9. The apparatus of claim 7 wherein said actuating means further comprises means for biasing said actuating bellows such that said compensating bellows will preferentially expand or contract relative to said actuating bellows in response to normal changes in coolant pressure.

10. The apparatus of claim 8 wherein said actuating means further comprises means for biasing said actuating bellows such that said compensating bellows will preferentially expand or contract relative to said actuating bellows in response to normal changes in coolant pressure.

11. The apparatus of claim 9 wherein said second cavity is fully contained within said first cavity.

* * * * *

UNITED STATES PATENT OFFICE
CERTIFICATE OF CORRECTION

Patent No. 4,167,443          Dated  September 11, 1979

Inventor(s)  Richard C. Noyes & Shakir U. Zaman & Douglas W. Stuteville

It is certified that error appears in the above-identified patent and that said Letters Patent are hereby corrected as shown below:

Column 4, line 41 after "actuating" insert --bellows--;

Column 5, line 15 change "pressure" to --passing--.

Signed and Sealed this

Fifth Day of February 1980

[SEAL]

Attest:

SIDNEY A. DIAMOND

*Attesting Officer*   *Commissioner of Patents and Trademarks*